United States Patent

Hegler et al.

[11] Patent Number: 5,071,173
[45] Date of Patent: Dec. 10, 1991

[54] PLASTIC PIPE FOR SEWER PIPE RECONSTRUCTION

[75] Inventors: Wilhelm Hegler, Goethestrasse 2, D-8730 Bad Kissingen; Ralph-Peter Hegler, Bad Kissingen, both of Fed. Rep. of Germany

[73] Assignee: Wilhelm Hegler, Bad Kissingen, Fed. Rep. of Germany

[21] Appl. No.: 542,505

[22] Filed: Jun. 25, 1990

[30] Foreign Application Priority Data

Jun. 28, 1989 [DE] Fed. Rep. of Germany ....... 3921075

[51] Int. Cl.$^5$ ................................................. F16L 21/00
[52] U.S. Cl. ..................................... 285/138; 285/423; 285/903; 285/921
[58] Field of Search ............... 285/138, 260, 305, 423, 285/903, 921, 369; 138/109, 121, 122

[56] References Cited

U.S. PATENT DOCUMENTS

| 1,324,602 | 12/1919 | Lorenz | 285/305 X |
|---|---|---|---|
| 3,602,263 | 8/1971 | Bremner . | |
| 3,677,676 | 7/1972 | Hegler . | |
| 3,897,090 | 7/1975 | Maroschak | 285/260 |
| 3,899,198 | 8/1975 | Maroschak | 285/903 X |
| 3,926,222 | 12/1975 | Shroy et al. | 285/260 X |
| 3,929,359 | 12/1975 | Schmunk et al. | 285/903 X |
| 3,958,425 | 5/1976 | Marosechak | 285/903 X |
| 4,082,327 | 4/1978 | Sting et al. | 285/260 X |
| 4,202,568 | 5/1980 | Ström | 285/903 X |
| 4,304,415 | 12/1981 | Wolf et al. . | |
| 4,754,781 | 7/1988 | De Putter . | |
| 4,779,651 | 10/1988 | Hegler et al. | 285/903 X |
| 4,900,503 | 2/1990 | Hegler . | |
| 4,915,425 | 4/1990 | Hegler et al. | 285/903 X |
| 4,969,670 | 11/1990 | Bonnema et al. | 285/903 X |

FOREIGN PATENT DOCUMENTS

| 0964310 | 3/1975 | Canada | 285/903 |
|---|---|---|---|
| 0275055 | 1/1988 | European Pat. Off. . | |
| 1955488 | 5/1970 | Fed. Rep. of Germany . | |

Primary Examiner—Dave W. Arola
Assistant Examiner—Heather Chun
Attorney, Agent, or Firm—Browdy and Neimark

[57] ABSTRACT

A plastic pipe for sewer pipe reconstruction has at least one spigot, the outer diameter of which is smaller than the outer diameter of the pipe. It has furthermore a socket end the outer diameter of which is substantially equal to the outer diameter of the pipe. Its inner diameter is substantially equal to the outer diameter of the spigot. In order to construct such a pipe that, while having high crushing strength, it has low weight and insensitivity to damage in the outer area, and can be used for short-pipe relining, the pipe and the at least one spigot have annular protrusions. Furthermore, the outer diameter of the protrusions of the spigot corresponds substantially to the inner diameter of the socket end. The pipe is very rigid.

13 Claims, 5 Drawing Sheets

PLASTIC PIPE FOR SEWER PIPE RECONSTRUCTION

FIELD OF THE INVENTION

The invention relates to a plastic pipe for sewer pipe reconstruction, with at least one spigot, the outer diameter of which is smaller than the outer diameter of the pipe, with a socket end the outer diameter of which is substantially equal to the outer diameter of the pipe and the inner diameter of which is substantially equal to the outer diameter of the spigot, and with a common central longitudinal axis of the pipe, the spigot and the socket end.

BACKGROUND OF THE INVENTION

It has long been known that the sewer pipe network which, since the 19th century, has consisted preferably of concrete pipes, is in need of reconstruction. This is in particular true for conurbations and large cities. In the Federal Republic of Germany alone it is estimated that several million meters of sewer pipes are in need of reconstruction. Alongside with the exchange of sewer pipes, recourse is often had, for sewer pipe reconstruction to a technique termed "relining method". In this connection a distinction is made between a so-called long pipe relining and a short pipe relining. With this method, plastic pipes are pushed or pulled in existing pipes which have ceased to be water-tight and which are usually made of concrete, stoneware, cast iron or the like. The hollow space left between the plastic pipe and the sewer pipe is filled in with an injection compound for the purpose of stabilization and sealing of the overall pipe network.

In long pipe relining use is made almost exclusively of high pressure polyethylene full-walled pipes and polypropylene full-walled pipes which, at the site concerned, are welded flush to the thrust surfaces as required by production or transport. In this connection it is known from U.S. Pat. No. 4,754,781 to use a flexible composite pipe, the inner pipe of which and the outer pipe of which must be made respectively of very soft flexible plastics to make possible a pulling of the plastic pipe into an existing sewer pipe, the pipe having to be flexible around a very narrow radius of curvature. This extreme flexibility of the pipe, for a simultaneous adequately high crushing strength, is not achievable as the claims of flexibility and rigidity are not mutually combinable. In addition, this system is not functionally viable as, after the introduction of the injection compound and the pulling around an extremely close radius of curvature the pipe made in soft plastic will collapse at least partly.

From European published patent application 0 275 055 it is known, with respect ot a plastic full-walled pipe, to provide at one end a protruding socket end and at the other end to form a top narrowed down in diameter. Pipes joined together are assembled externally flush or level with the bottom and thus exhibit on the outer surface none of the projections which increase the diameter of the pipe. Such full-walled pipes are used for the so-called short pipe relining, by means of which the drawbacks of long pipe relining, on the one hand, and disturbing earthwork, on the other hand, are considerably avoided. A substantial drawback of these full-walled pipes lies in that, to achieve an adequate crushing strength, they have to be very heavy, and thus with a very great wall strength and in that, on pulling or pushing in the pipes, leakages are produced in the plastic pipe as a result of breaks in the sewer pipe to be lined. Independently of resistance considerations this pipe must have a certain minimum wall thickness, because, from said thickness, the spigot at one end and the socket end at the other have to be formed, it being necessary in some cases to accommodate axial connections also between the two. In addition, such a pipe is only cumbersome to produce, as socket end and spigot either have to be made subsequently by machining, or socket end and spigot have to be formed on subsequently by injection moulding.

A long pipe relining is known from German published patent application 1,955,488, in which a pipe is first reamed and then provided with a pipe-like lining of polyethylene, with mortar being injected into the gap between the inner surface of the pipe and the outer surface of the plastic pipe introduced.

SUMMARY OF THE INVENTION

It is the object of the invention to provide a plastic pipe of the type first defined hereinabove in such a way that high crushing strength and low weight as well as insensitivity to injuries in the external area are achieved, and that it can be used in short pipe relining.

This object is achieved according to the invention in that the pipe and the at least one spigot are provided with annular protrusions, and in that the outer diameter of the protrusions of the spigot is identical with the outer diameter of the spigot and corresponds substantially to the inner diameter of the socket end.

The plastic pipe of the invention may be a compound or composite pipe or a ribbed pipe. These pipes have, when choosing an adequately stiff or rigid plastic, a high crushing strength and in terms of this solidity they are very light. When the material is the same and the crushing strength is comparable, the weight of a composite pipe as compared with a full-walled pipe is only about 50%, and that of a ribbed pipe as compared with the full-walled pipe is only about 70% of the respective full-walled pipe. When the plastic pipe becomes damaged on the outside on pulling or pushing into a sewer pipe to be reconstructed, then either the annular ring of the composite pipe or a rib of the ribbed pipe are the only items damaged. The actual pipe, i.e. the inner pipe, remains always undamaged so that the danger of leaks is ruled out. As a result of the special conformation of the ribs or annular rings in the region of the spigot, an exceptionally level or externally flush conformation for such pipes is made possible, i.e. a consistent outer diameter, so that it is not possible for any obstacles to protrude above the outer diameter of the pipe in its area between socket end or spigot. Such composite pipes or ribbed pipes are made in a continuous process on machines, such as known from U.S. Pat. No. 3,677,676.

A reduction of the effort of assembly may be achieved when making the socket end connection in that, in the case of composite pipes, at least one annular ring is provided which has protrusions extending outwards radially to the axis and bearing against the inner wall of the socket end. The identical advantageous effect is obtained in the case of ribbed pipes by providing the socket end with protrusions projecting inwards radially to the axis, which bear against at least one rib.

The protrusions are advantageously radially elastically deformable.

On the one hand, the socket end may be advantageously designed as a double plug-in socket which is mounted on two spigots of two pipes abutting against each other on a thrust surface. On the other hand, the pipe with the socket end can advantageously be one piece.

In order to achieve a connection of adequate tensile strength between two adjacent pipes the socket end is advantageously provided with stop cams which engage between two adjacent annular protrusions of a spigot.

Further details of the invention are supplied by the following description of examples of embodiment based on the drawings.

DESCRIPTION OF THE PREFERRED EMBODIMENTS

Figure 1:
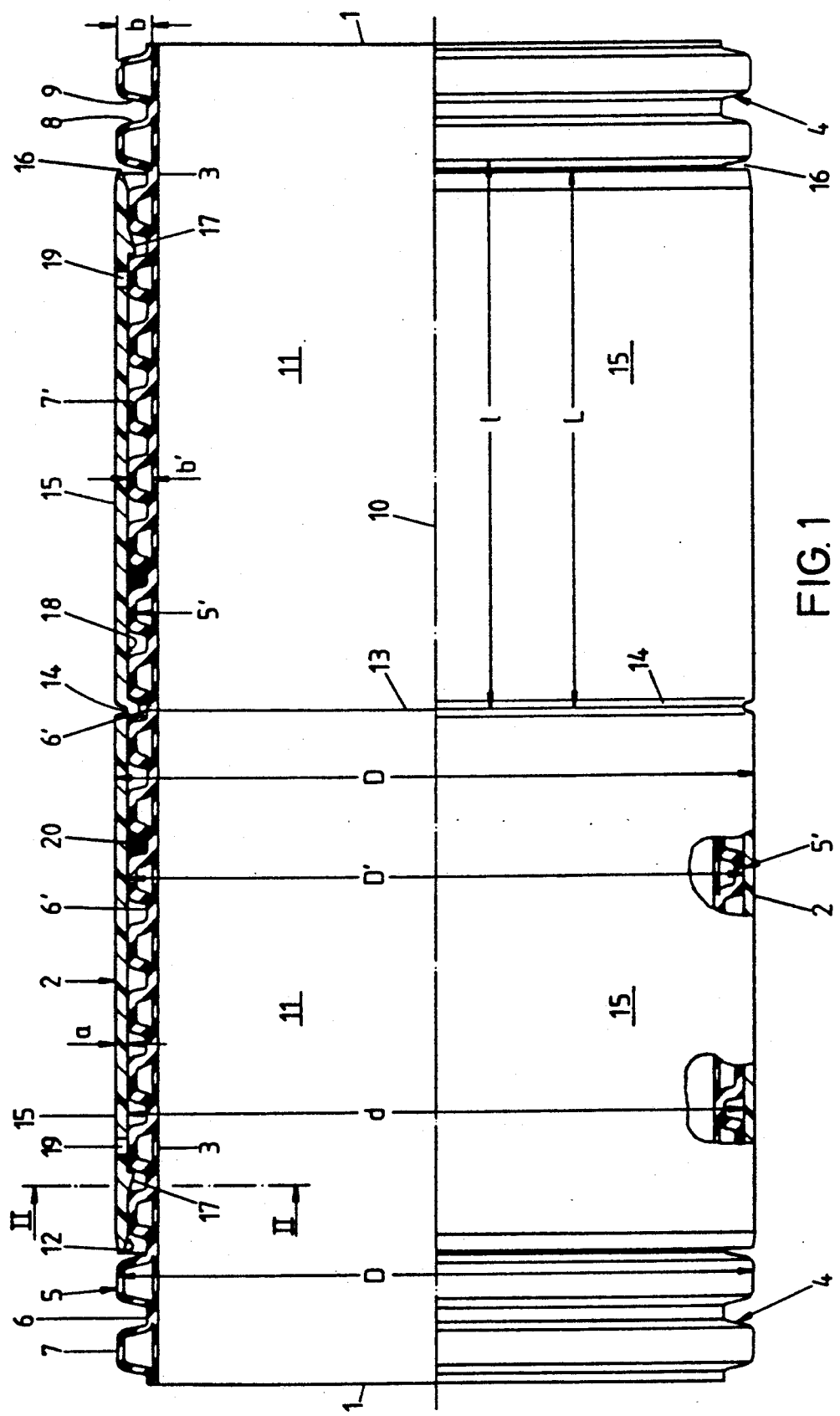
FIG. 1 is a connection of two composite pipes by means of a double plug-in socket.

In FIG. 1 a representation is given of two similarly constructed composite pipes 1 facing each other in mirror symmetry which are joined together by means of a double plug-in socket 2. The composite pipes 1 respectively have a through cylindrical inner pipe 3 and a corrugated outer pipe 4. The making of these composite pipes is effected in a manner known from U.S. Pat. No. 3,677,676, the connection between inner pipe 3 and outer pipe 4 being effected when the thermoplastic tubes of plastic material later constituting the inner pipe 3 and the outer pipe 4 are passed together behind the injection head of the extruder. In the region between two adjacent annular rings 5 of the outer pipe 4, and thus in the region of a corrugation trough 6, the inner pipe 3 and the outer pipe 4 are formed in one piece.

Each annular ring 5 has—as shown in the drawing—the cross-section of a slightly outwardly narrowing trapezium, this trapezium cross-section being defined externally by means of an annular cylindrical outer wall portion 7 and laterally by means of two side wall portions 8, 9 which—related to the central longitudinal axis 10 of the respective composite pipe 1—are radially outwardly inclined one towards the other. The base of the trapezium is formed by the respective inner pipe 3.

Each composite pipe 1 has a socalled spigot 11 which is the end portion of the composite pipe 1 which is pushed into the double plug-in socket 2.

The composite pipe 1 has in its region in each instance on the other side of the spigot 11 an outer diameter D which is equal to the outer diameter D of the double plug-in socket 2. The double plug-in socket 2 is designed annular cylindrical and has a wall thickness a. Therefore $d = D - 2a$ is its inner diameter d.

The outer diameter $D'$ of the respective spigot 11 is approximately equal to the inner diameter d of the plug-in socket 2, so that the plug-in socket 2 can still be pushed on the respective spigot, but fits subsequently without play on the latter.

To facilitate the pushing together of spigot 11 and plug-in socket 2, the plug-in socket 2 has an insertion slanting surface 12 at each end. In the region of the thrust surface 13 of the two composite pipes 1, i.e. where these two thrust flush against each other, the plug-in socket 2 has a surrounding stop 14 directed radially inwards which protrudes into the corrugation trough 6' formed on the thrust surface 13. By this means the position of each spigot 11 relative to the plug-in socket 2 is established. As may be observed from FIG. 1 the length L of a portion 15 of the plug-in socket 2 provided between the stop 14 and the end of the plug-in socket 2 corresponds to the length 1 of a spigot 11, so that the plug-in socket 2 not only lies externally flush with the respective composite pipe 1 because of the equal diameter D but also as a maximum a gap 16—required through assembly reasons—is formed between the end of the plug-in socket 2 and the first annular ring 5 of the composite pipe 1, the axial extension of which is smaller than the axial distance between the facing side wall portions 8, 9 of two adjacent annular rings 5.

As the drawing shows, the annular rings 5' at the respective spigot 11 have a thicker wall than the annular rings 5 in the region of the composite pipe 1 on the other side of the spigot 11. This is a consequence of the continuous production technique referred to hereinabove according to which the same amount of plastic is contained in each case in the annular rings 5 and 5'. Because of the clearly smaller height b' of the annular rings 5' as compared with the height b of the annular rings 5 the annular rings 5' are designed with a thicker wall.

Figure 2:
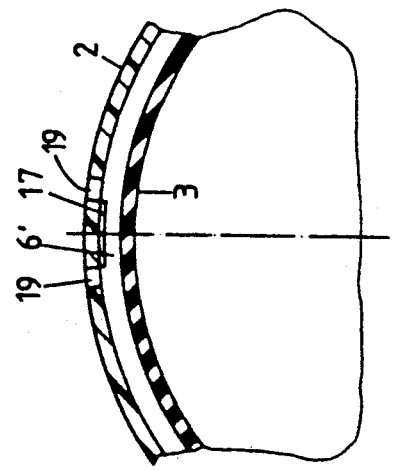
FIG. 2 is a partial section through the composite pipe with a plug-in socket of FIG. 1 along the sectional line II—II in FIG. 1.

In order to produce a connection of tensile strength between the respective portion 15 of the plug-in socket 2 and the associated spigot 11 of the respective composite pipe 1, stop cams 17 are formed on the plug-in socket 2 which project radially inwards from the cylindrical inner wall 18 of the plug-in socket 2, so that, after pushing a portion 15 of the plug-in socket 2 onto a spigot 11, they engage elastically into a corrugation trough 6' between two adjacent annular rings 5'. Such stop cams 17 may be injection-moulded on at the time of the production of the plug-in socket 2, or formed subsequently. As FIG. 2 shows, it is possible, in the surrounding plane in which the stop cams 17 are respectively provided, to form slots 19 in the plug-in socket 2 which, on the pushing of the plug-in socket 2 onto the spigot 11 permit a radial yielding of the stop cams 17 so that the stop cams 17 can be pushed along over the outer wall portions 7' of the annular rings 5'. As FIG. 1 shows, in at least one corrugation trough 6' of each spigot 11, a profiled sealing ring 20 is provided with effects a sealed connection between plug-in socket 2 and spigot 11. Such seals are known, e.g., from U.S. Pat. No. 4,304,415.

Figure 3:
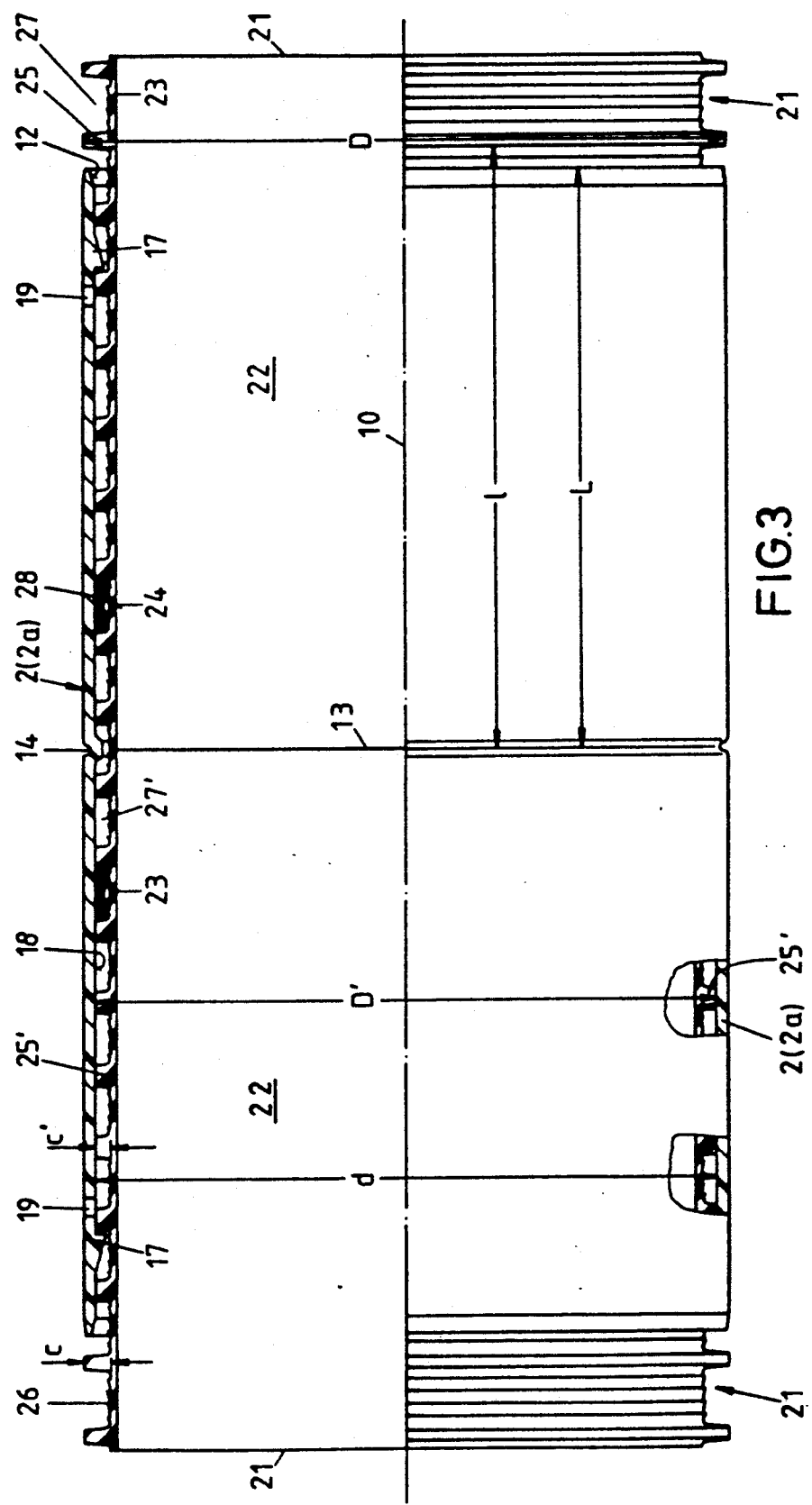
FIG. 3 is a connection of two ribbed pipes by means of a double plug-in socket.

In the example of embodiment of FIG. 3 two ribbed pipes 21 are shown which, by their spigots 22, abut flush one against the other, and are joined together by means of a double plug-in socket 2 which is constructed in identical manner with the double plug-in socket 2 of the example of embodiment of FIGS. 1 and 2. Such a ribbed pipe 21 has a pipe 23 substanially cylindrical, the inner wall 24 of which, in a manner similar to that of the composite pipe 1, is cylindrically smooth. On its outside the pipe 23 has radially outwardly protruding annular ribs 25. These ribs 25 have — as shown by FIG. 3 — a trapezoidal section which tapers down outwards. Between the adjacent ribs 25 annular protrusions 26 are formed on the outer wall of pipe 23. The making of these ribbed tubes is known substantially from U.S. Ser. No. 07/227,424, now U.S. Pat. No. 4,900,503.

As will be seen in FIG. 3 the ribs 25' have in the region of the respective spigot a smaller height c' than the ribs 25 outside the respective spigot 22. Here, the ribs 25 have a height c. The reason for this also lies in the continuous production techniques, as was already outlined above. Grooves 27 are provided between adjacent ribs 25. In at least one groove 27' in each instance respectively, there is provided between two adjacent ribs 25' of the respective spigot 22 an annular seal 28 which ensures a sealed connection between the inner wall 18 of the double plug-in socket 2 and the respective spigot 22.

The above comments apply also to the diameter ratios; for this reason there have been selected also for the referencing of the diameters of FIG. 3 the identical one used in FIGS. 1 and 2. The stop cams 17 of the plug-in socket 2 place themselves in each instance behind a rib 25' in a correspondingly associated groove 27' of the respective spigot 22.

Figure 4:
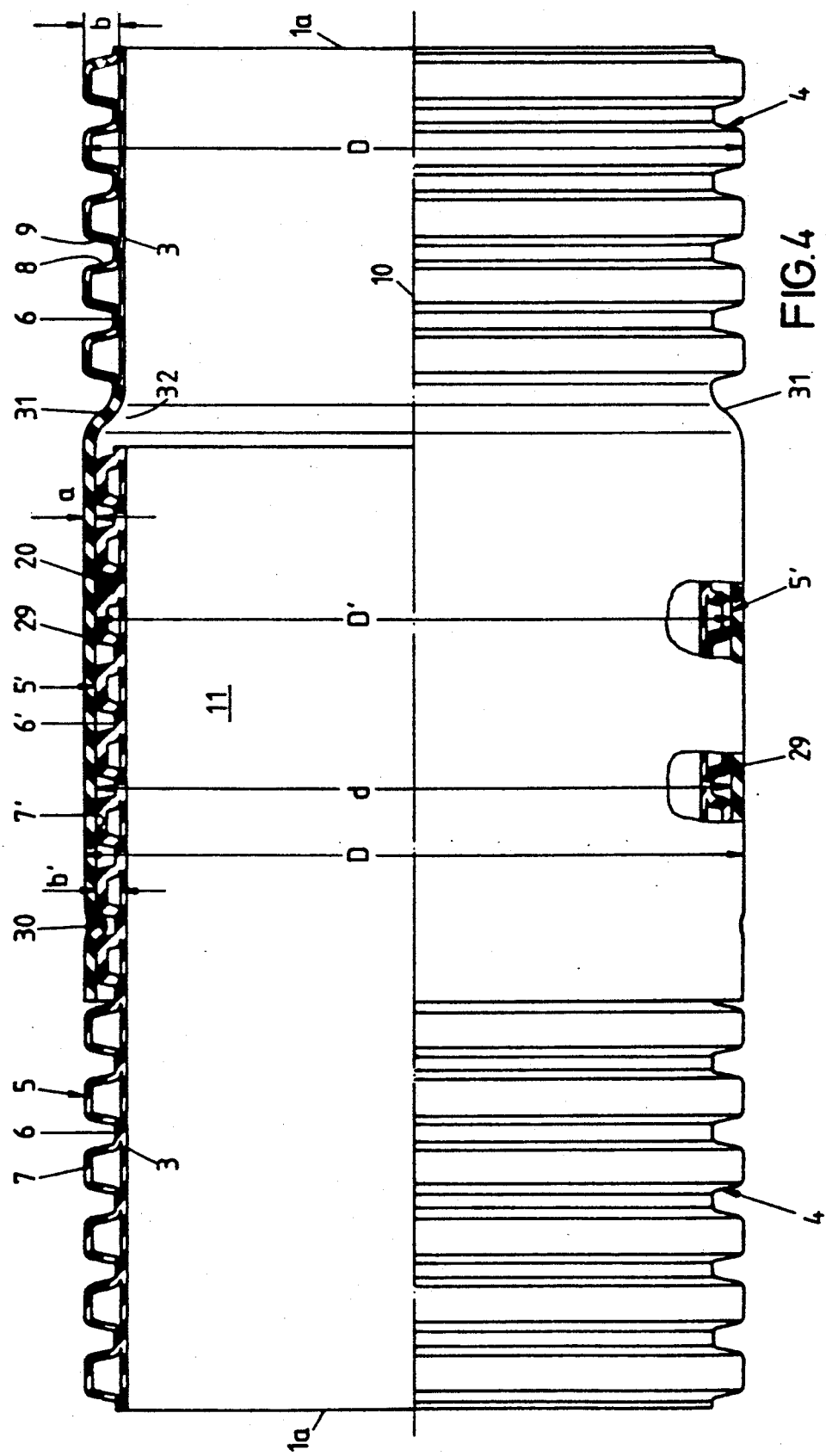
FIG. 4 is a connection of two composite pipes by means of an integrally shaped socket end.

Whereas in the examples of embodiment of FIGS. 1 and 3 each composite pipe 1 or each ribbed pipe 21 is provided at both ends with a spigot 11 or 22, in the example of embodiment of FIG. 4 in each instance a composite pipe 1a is provided at one end with a spigot 11 and at its other end with an integrally formed socket end 29. As the composite pipe 1a between spigot 11 and integrally formed socket end 29, and in the region of the spigot 11 is itself identical with the composite pipes 1 with spigot 11 of the example of embodiment of FIG. 1, a repeated description can in this respect be dispensed with. The same reference figures are used. The socket end 29 formed as one piece on the composite pipe 1a has a wall thickness a, an outer diameter D and an inner diameter d. It is provided with integrally formed stop cams 30. It is shaped as one piece from the inner pipe 3 and the outer pipe 4 in the region of a corrugation trough 6 and has a relatively short transition from the actual composite pipe 1a to the socket end 29 in order to keep as small as possible the dead space 32 which arises in this region between the inner pipe 3 of the spigot 11 and the inner pipe 3 of the composite pipe 1a in the region of this transition 31.

In FIGS. 5 to 10 representations are given of various possibilities of reducing the effort of assembly on the production of the socket end connection, i.e. on pushing together the spigot with the socket end. In the case of composite pipes this may be effected by means of a special design of the annular rings, in that these have only a point or line contact with the inner wall of the plug-in socket 2 or equally a socket end 29. By this means there is achieved also an exact centering of socket end 2 and spigot 11.

Figure 5:
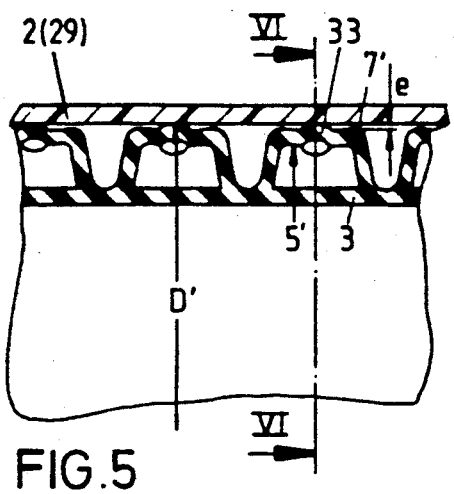
FIG. 5 is a partial longitudinal section through a connection of composite pipe with socket end.
Figure 6:
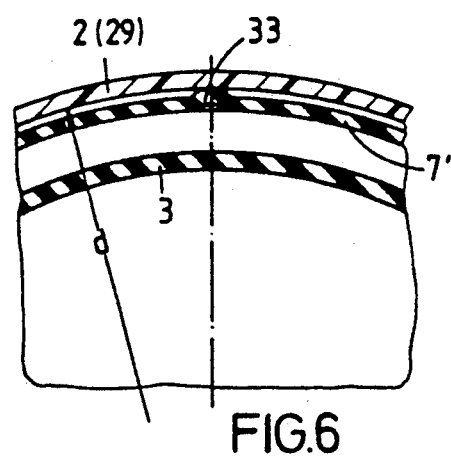
FIG. 6 is a part cross-section through the composite pipe with socket end of FIG. 5 corresponding to the sectional line VI—VI in FIG. 5.

In the construction according to FIGS. 5 to 6 the outer wall portion 7' is provided with knob-shaped protuberances 33 distributed over the periphery.

The outer diameter D' in this case is measured starting from the protuberances 33.

Figure 7:
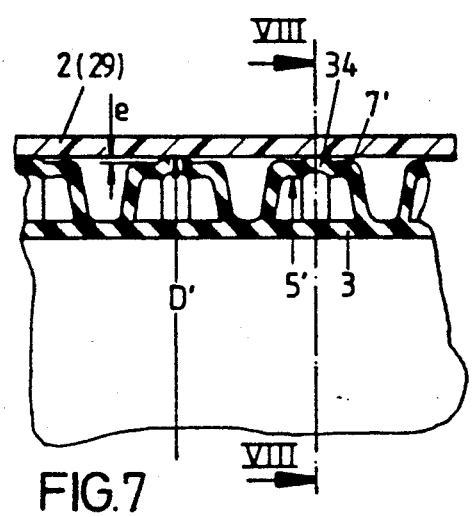
FIG. 7 is a part longitudinal section through a connection of composite pipe with socket end in a modified embodiment.
Figure 8:
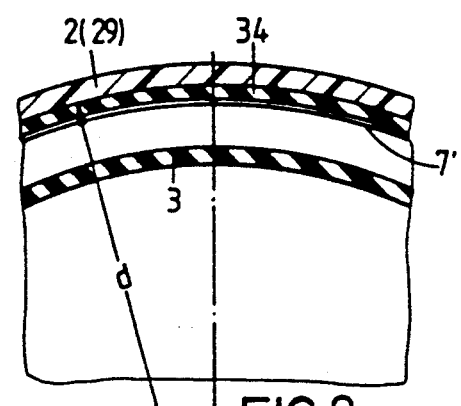
FIG. 8 is a part cross-section through the connection of composite pipe with socket end of FIG. 7 along the sectional line VIII—VIII in FIG. 7.

In the embodiment of FIGS. 7 and 8 the outer wall portion 7' is provided in each instance with an annularly surrounding flat protuberance 34 which is shaped from the outer wall portion 7'. As opposed to the construction of FIGS. 5 and 6 where there is only an (approximate) point contact between the protuberance 33 and the inner wall 18 of the socket end 2, there is here linear contact.

Figure 9:
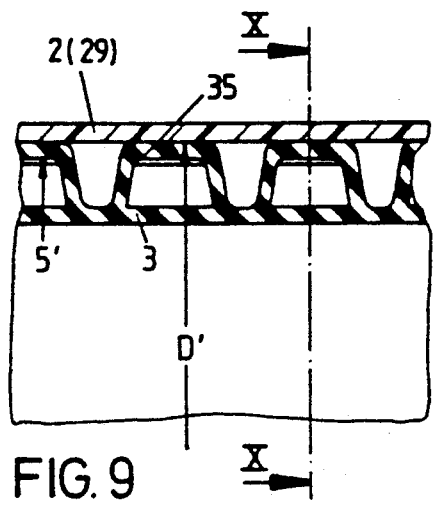
FIG. 9 is a part longitudinal section through a connection of a composite pipe with socket end in a further modified embodiment.
Figure 10:
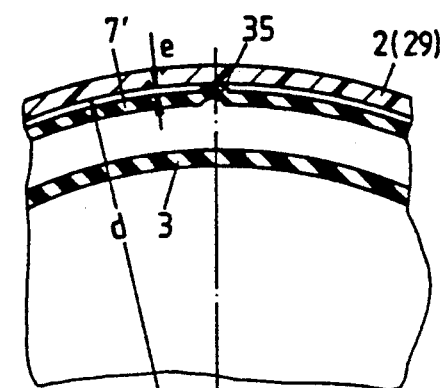
FIG. 10 is a part cross-section through the connection of composite pipe with socket end according to FIG. 9 along the sectional line X—X in FIG. 9.

In the construction of FIGS. 9 and 10 there is formed on the cylindrical outer wall portions 7' in each case a linear axial protuberances 35 extending parallel with the axis 10.

In the constructions of FIGS. 5 to 10—when the assembly of spigot 11 and socket end 2 has not yet been effect—the outer diameter D' of the spigot 11 may be in each case slightly greater than the inner diameter d of the socket end 2. If the height of the respective protuberance 33, 34, 35 above the outside of the outer wall portion 7' is denoted by e, there may apply here $D'>d>D'-2e$. An elastic deformation of the circular rings 5' takes place in this area. For the ratio of the inner diameter d of the plug-in socket 2 or of the integrally formed socket end 29 to the height e of the protuberances 33, 34, 35 there applies $0.002\ d \leq e \leq 0.004\ d$, these measurements applying to a socket end not yet mounted and a spigot not yet mounted.

Figure 12:
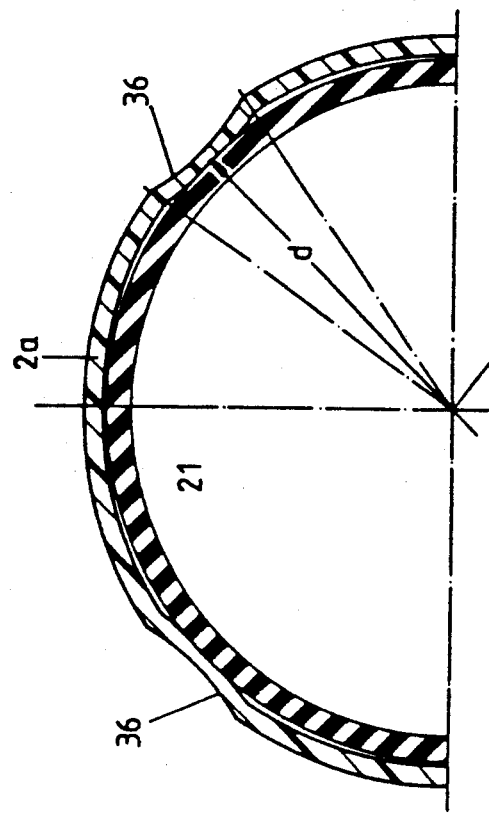
FIG. 12 is a part cross-section through the connection of ribbed pipe and socket end along the sectional line XII—XII of FIG. 11.
Figure 11:
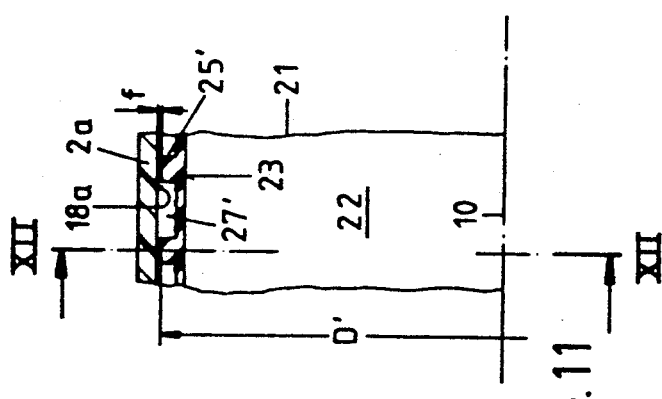
FIG. 11 is a part longitudinal section through a connection of ribbed pipe and socket end.

If it is intended to reduce the effort of assembly for a ribbed pipe 21, then a construction according to FIGS. 11 and 12 may be provided. In this event the socket end 2a which may be, on the one hand, a double plug-in socket and, on the other hand, also an integrally formed socket end, is fitted with continously extending beads parallel with the longitudinal axis 10, and thus extension 36 directed radially inwards. These project radially from the inner wall 18a of the socket end 2a by a measurement f. The outer diameter D' of the spigot 22, i.e. the outer diameter of the ribs 25' is in this case to some extend greater than the inner diameter d of the socket end 2a measured from the extensions 36. Here also the ratio $d+2f>D'>d$ applies. For the height f of the protrusions 36 as compared with the inner diameter d of the socket end 2a there applies $0.002\ d \leq f \leq 0.004\ d$, the above-mentioned measurements applying respectively to an unmounted socket end 2a and correspondingly to a spigot 22 not yet mounted.

Coming into consideration as materials particularly for composite pipes are PE-HD (high pressure polyethylene) and PP (polypropylene), the inner pipe 3 and the outer pipe 4 being made from the same material. UPVC (hard polyvinyl chloride) comes primarily into consideration for ribbed pipes.

It is important when choosing the material and the dimensioning of the pipes and of the socket ends that the pipes should have, on the one hand, a high crushing strength and, on the other hand, a high axial resistance, so that, on the one hand, they can perform their lining function adequately, and on the other hand, they can be pushed under pressure in existing sewer pipes.

Although the pipes described are primarily designed and usable for sewer pipe reconstruction, the lever, i.e. the externally flush connection is also advantageously utilizable in other situations. This applies for example to the basic drainage of garbage dumps in the areas of garbage sealing. In this case, the pipes described would have to be provided with perforations, i.e. designed as drop pipes.

What is claimed is:

1. A composite plastic pipe for sewer pipe reconstruction, comprising plural pipe sections and including;

a wall (3, 23) of a first section having a first portion with outwardly extending first annular protrusions (5, 25) defining an outer diameter (D) of the pipe (1, 1a, 21);

at least one spigot portion (11, 22) of said first section, having outwardly extending second annular protrusions (5', 25') defining an outer diameter (D') which is smaller than the outer diameter (D) of the pipe (1, 1a, 21);

a second section comprising a socket (2, 2a, 29), having an outer diameter (D) which is substantially equal to the otuer diameter (D) of the pipe (1, 1a, 21) and having an inner diameter (d) which is substantially equal to the outer diameter (D') of the spigot (11, 22); and a common central longitudinal axis (10) of the pipe (1, 1a, 21), of the spigot (11, 22) and of the socket end (2, 2a, 29), wherein said outer diameter (D') of said protrusions (5', 25') of the spigot (11, 22) corresponds substantially to the inner diameter (d) of the socket (2, 2a, 29), whereby said first and second sections of said plastic pipe connected together with said spigot of said first section tightly interfitting within said socket provide a consistent outer diameter (D).

2. A plastic pipe according to claim 1, wherein the pipe is a composite pipe (1, 1a) comprising an inner pipe (3) and an outer pipe (4) provided with annular rings (5, 5'), the outer diameter (D') of the annular rings (5') of the spigot (11) corresponding substantially to the inner diameter (d) of the socket end (2, 2a, 29).

3. A plastic pipe according to claim 2, wherein at least one circular ring (5') is provided with protuberances (33, 34, 35) extending outwards radially with respect (10) and bearing against an inner wall (18) of the socket end (2, 29).

4. A plastic pipe according to claim 3, wherein the protuberances (33, 34, 35) are radially elastically deformable.

5. A plastic pipe according to claim 3 wherein for the radial height (e) of the protuberances (33, 34, 35) with respect to the outer diameter (D') of the spigot (11) and to the inner diameter (d) of the socket end (2, 29) the following applies: $D' > d > D' - 2e$.

6. A plastic pipe according to claim 1, wherein the pipe is a ribbed pipe (21) which consists of a pipe (23) having annularly surrounding ribs (25, 25') on its outside, the outer diameter (D') of the ribs (25') of the spigot (22) corresponding substantially to the inner diameter (d) of the socket end (2, 2a).

7. A plastic pipe according to claim 3, wherein the socket end (2a) is provided with extensions (36) projecting inwards with respect to the axis (10) which bear at least against one rib (25').

8. A plastic pipe according to claim 7, wherein for the radial height (f) of the extensisons (36) with respect to the outer diameter (D') of the spigot (22) and with respect to the inner diameter (d) of the socket end the following applies: $d + 2f > D'd$.

9. A plastic pipe according to claim 7, wherein the extensions (36) are radially elastically deformable.

10. A plastic pipe according to claim 1, wherein the socket end is a double plug-in socket (2, 2a) which is mounted on two spigots (11, 22) of two pipe (1, 2) abutting against each other on a thrust surface (13).

11. A plastic pipe according to claim 1, wherein the pipe (1) with the socket end (29) is one piece.

12. A plastic pipe according to claim 1, wherein the socket end (2, 2a, 29) is provided with stop cams (17, 30) which, for the provision of a connection of tensile strength, engage between two adjacent second annular protrusions (5', 25') of a spigot (11, 22).

13. A composite plastic pipe for sewer pipe reconstruction, comprising:

a first section with a cylindrical wall having a generally uniform inner diameter with first annular protrusions of a first height extending outwardly therefrom, said first annular protrusions having outer surfaces defining a first outer diameter D of said pipe;

a spigot portion of said first section having second annular protrusions of a second height less than said first height extending outwardly therefrom with outer surfaces defining a second outer diameter D' which is smaller than said first outer diameter D;

a second section comprising a socket with a cylindrical wall having an outer diameter substantially equal to said first outer diameter D and an inner diameter substantially equal to said second outer diameter D', whereby said spigot portion of said first section of said pipe tightly interfits within said socket of said second section of said pipe to provide a consistent outer diameter D.

* * * * *